(12) United States Patent
Erickson et al.

(10) Patent No.: US 8,539,425 B1
(45) Date of Patent: Sep. 17, 2013

(54) UTILIZING GATE PHASES FOR CIRCUIT TUNING

(75) Inventors: Karl L. Erickson, Rochester, MN (US); Phil C. Paone, Rochester, MN (US); David P. Paulsen, Dodge Center, MN (US); John E. Sheets, II, Zumbrota, MN (US); Gregory J. Uhlmann, Rochester, MN (US); Kelly L. Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 13/432,349

(22) Filed: Mar. 28, 2012

(51) Int. Cl.
*G06F 17/50* (2006.01)
*G06F 9/455* (2006.01)

(52) U.S. Cl.
USPC .............................. 716/134; 716/51; 716/54

(58) Field of Classification Search
None
See application file for complete search history.

(56) References Cited

U.S. PATENT DOCUMENTS

| | | | |
|---|---|---|---|
| 4,763,289 A | 8/1988 | Barzilai et al. | |
| 6,654,943 B2 | 11/2003 | Clabes et al. | |
| 6,698,008 B2 | 2/2004 | McCullen et al. | |
| 6,836,877 B1 | 12/2004 | Dupenloup | |
| 7,114,134 B2 | 9/2006 | Zhang et al. | |
| 7,464,351 B2 * | 12/2008 | Bamji et al. | 716/50 |
| 7,594,202 B2 | 9/2009 | de Dood et al. | |
| 7,634,749 B1 * | 12/2009 | Cortadella et al. | 716/100 |
| 7,716,618 B2 | 5/2010 | Ferrari et al. | |
| 8,024,695 B2 | 9/2011 | Reis et al. | |
| 2009/0212819 A1 | 8/2009 | Dotson et al. | |

\* cited by examiner

*Primary Examiner* — Annette M. Thompson
(74) *Attorney, Agent, or Firm* — Joan Pennington

(57) ABSTRACT

Implementing circuit tuning post design of an integrated circuit utilizing gate phases. Each phase includes a designation of one of a slow phase and a fast phase. During the circuit design phase, each device is given a phase designation based upon expected performance of the device in the circuit. If the device is expected to be in a critical path or has a minimum timing slack, the device is placed on the fast phase. If the device is not in a critical path or has excess timing slack the device is placed on the slow phase.

20 Claims, 4 Drawing Sheets

UTILIZING GATE PHASES FOR CIRCUIT TUNING

FIELD OF THE INVENTION

The present invention relates generally to the data processing field, and more particularly, relates to a method, system and computer program product for implementing circuit tuning post design of an integrated circuit utilizing gate phases.

DESCRIPTION OF THE RELATED ART

In integrated circuit design, dual-phase gate printing typically is utilized. Due to lithography limitations, gates are printed in even and odd steps. This can cause the gate lengths to vary slightly between the phases.

A need exists for an efficient and effective mechanism to implement enhanced circuit tuning of an integrated circuit chip. It is also desirable to provide such mechanism that enhances at least one of system power or system performance, or both. It is desirable to provide such mechanism which implements circuit tuning post design of an integrated circuit utilizing gate phase assignments during the circuit design phase and during the fabrication process.

SUMMARY OF THE INVENTION

A principal aspect of the present invention is to provide a method, system and computer program product for implementing circuit tuning post design of an integrated circuit utilizing gate phases. Other important aspects of the present invention are to provide such method, system, and computer program product substantially without negative effects and that overcome many of the disadvantages of prior art arrangements.

In brief, a method, system and computer program product are provided for implementing circuit tuning post design of an integrated circuit utilizing gate phases. Each phase includes a designation of one of a slow phase and a fast phase. During the circuit design phase, each device is given a phase designation based upon expected performance of the device in the circuit. If the device is expected to be in a critical path or has a minimum timing slack, the device is placed on the fast phase. If the device is not in a critical path or has excess timing slack the device is placed on the slow phase.

In accordance with features of the invention, post-design circuit tuning utilizing gate phases advantageously is provided during design process and during the fabrication process.

In accordance with features of the invention, gates or fingers of devices are purposely and intelligently placed on one phase or the other to decrease system power usage or increase performance, or to both increase performance and decrease system power usage.

In accordance with features of the invention, on devices, such as latches, where there are scan-inputs in addition to data inputs, the scan-in gates optionally are placed on the slow phase and the data-in gates optionally are placed on the fast phase.

In accordance with features of the invention, on stacked logic devices, the gates of the devices whose sources are not connected to ground are generally slower and are placed on the fast phase while gates of other devices optionally are placed on the slow phase.

In accordance with features of the invention, in an array, word-line drivers have multiple fingers optionally placed on each phase to cancel out the effects of the phase time delta, while read ports of storage cells optionally are placed on the fast phase and write ports of storage cells optionally are placed on the slow phase, enabling adjustment between writeability and stability.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing circuit tuning post design of an integrated circuit utilizing gate phases. Each device is given a phase designation depending on how the device is expected to perform in the circuit, requiring a performance consideration for each device. Also the invention advantageously provides post-design circuit tuning that can occur during the fabrication process. The invention adds one additional adjustment knob or delta L between the phases that can be tuned to increase performance and/or decrease power. Modern integrated circuit chips do tend to be wire-limited and/or use synthesizable logic with unused gate area so there are plenty of extra poly lines to accommodate favoritism toward one phase or the other in accordance with features of the invention.

Figure 1:
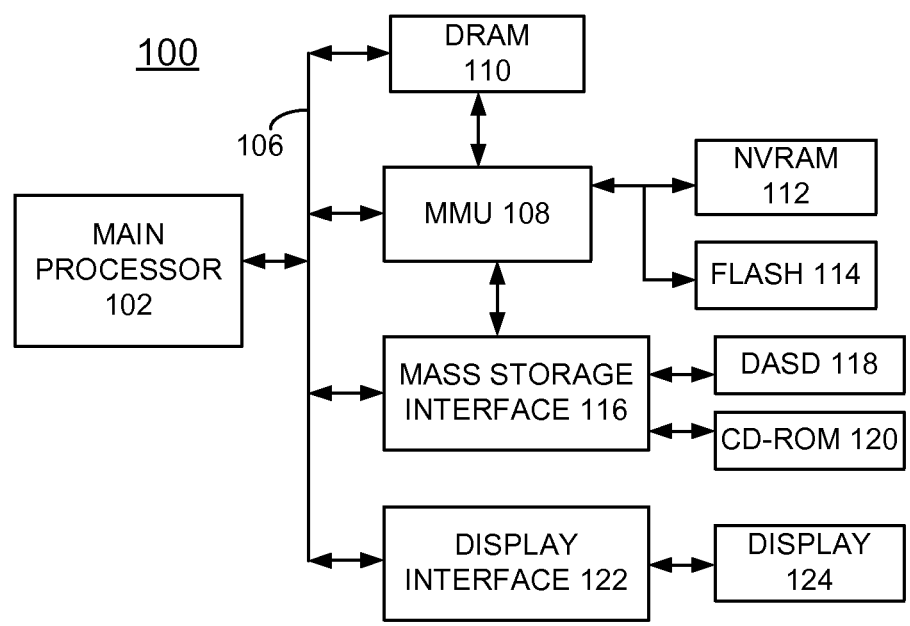
FIGS. 1 and 2 are block diagram representations illustrating an example computer system and operating system for implementing circuit tuning in a circuit design of an integrated circuit chip in accordance with the preferred embodiment.
Figure 2:
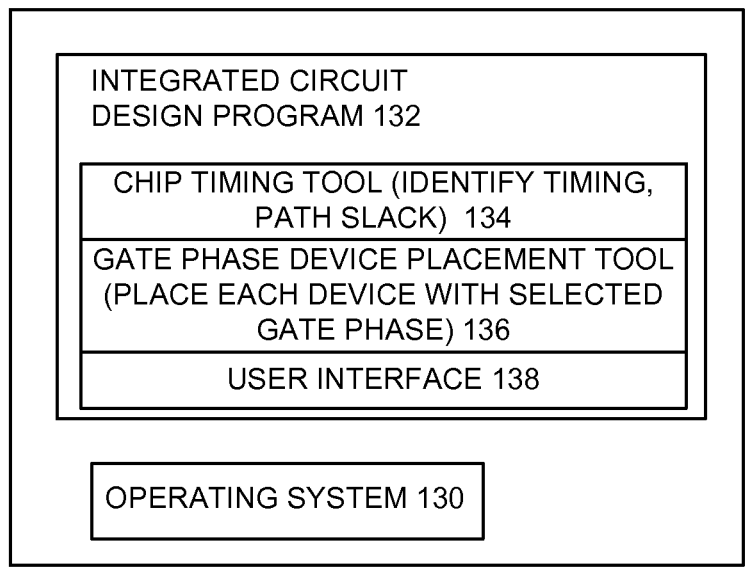

Referring now to the drawings, in FIGS. 1 and 2 there is shown a computer system generally designated by the reference character 100 for implementing circuit tuning post design of an integrated circuit utilizing gate phases in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

As shown in FIG. 2, computer system 100 includes an operating system 130, an integrated circuit design program 132, a chip timing tool 134 to identify timing and path slack, a gate phase device placement tool 136 using gate phases to place each device with a selected gate phase of the preferred embodiment, and a user interface 138.

Various commercially available computers can be used for computer system 100, for example, an IBM server computer. CPU 102 is suitably programmed by the integrated circuit design program 132, the chip timing tool 134 and the gate phase device placement tool 136 to execute the flowchart of FIG. 3 for implementing circuit tuning methods utilizing gate phases in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

In accordance with features of the invention, the gate phase device placement tool 136 uses gate phases for circuit tuning of the integrated circuit. Each device is given a phase designation based upon expected performance of the device in the circuit by the gate phase device placement tool 136. For a device expected to be in a critical path or having a minimum timing slack, the device is placed on the fast phase by the gate phase device placement tool 136. If the device is not in a critical path or has excess timing slack the device is placed on the slow phase by the gate phase device placement tool 136.

In accordance with features of the invention, the gate phase device placement tool 136 can place a first finger of a device on a fast phase and a second finger of the device on a slow phase if the device needs to be phase insensitive. The gate phase device placement tool 136 provides post-design circuit tuning utilizing gate phases during the fabrication process. The gate phase device placement tool 136 provides a shorter gate length utilizing fast gate phase processing to provide a faster device, for the device expected to be in a critical path or having a minimum timing slack. The gate phase device placement tool 136 provides a slightly longer gate length utilizing slow gate phase processing to provide a slower device. During fabrication, gate phase processing is used in even and odd steps, selecting one or both of exposure time duration or intensity for printing gates with shorter or slightly longer gate lengths.

In accordance with features of the invention, gates or fingers are purposely and intelligently placed on one phase or the other to decrease system power usage or increase performance, or to both increase performance and decrease system power usage, by the gate phase device placement tool 136 and using the chip timing tool 134.

In accordance with features of the invention, the gate phase device placement tool 136 on devices, such as latches, where there are scan-inputs in addition to data inputs, optionally places the scan-in gates on the slow phase and places the data-in gates on the fast phase. On stacked logic devices, the gates of the devices whose sources are not connected to ground are generally slower and are placed on the fast phase by the gate phase device placement tool 136 whereas the others devices are placed on the slow phase. In an array, the gate phase device placement tool 136 places multiple fingers of wordline drivers on each phase to cancel out the affects of the delta, while placing read ports of storage cells on the fast phase and placing write ports of storage cells on the slow phase, enabling adjustment between writeability and stability.

In accordance with features of the invention, back-filled capacitors and poly-fill capacitors are desirably placed on the slow phase, or selectively placed on the phase with less demand by the gate phase device placement tool 136. However, there is little concern in overloading one phase versus the other phase because there is much fast/slow polarity in current designs, while a design rule stating a maximum percentage on one phase or the other typically is provided in accordance with features of the invention.

Figure 3:
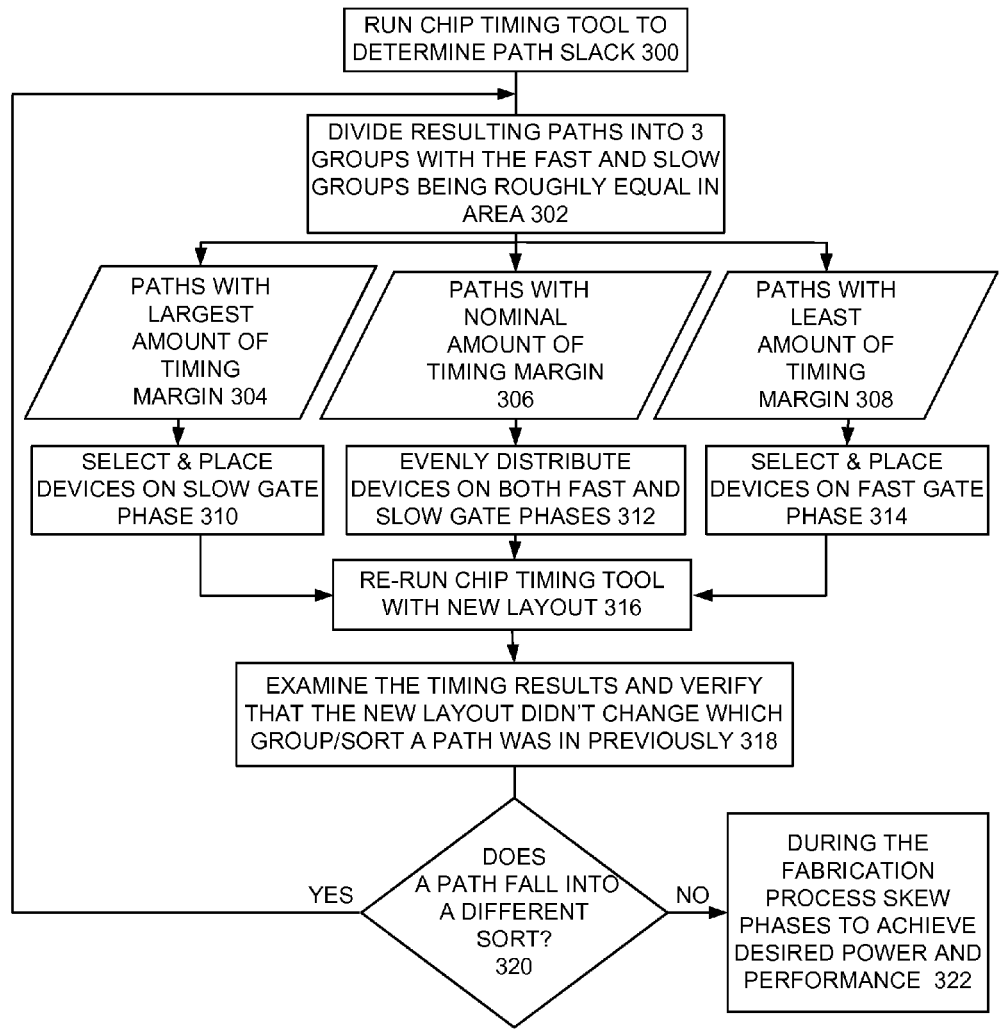
FIG. 3 is a flow chart illustrating exemplary sequential steps for implementing circuit tuning in a circuit design of an integrated circuit chip in accordance with the preferred embodiment.

Referring to FIG. 3, there are shown example steps for implementing circuit tuning post design of an integrated circuit utilizing gate phases in accordance with the preferred embodiment. First the chip timing tool 134 is run to determine path slack for the integrated circuit design as indicated at a block 300. Next resulting paths are divided into 3 groups including paths with a largest amount of timing margin, paths with a nominal amount of timing margin, and paths with a least amount of timing margin with fast and slow groups being roughly equal in area as indicated at a block 302.

As indicated at a block 304, paths are provided having a largest amount of timing margin. Paths are provided having a nominal amount of timing margin as indicated at a block 306. As indicated at a block 308, slow paths are provided having a least amount of timing margin.

From the provided paths with the largest amount of timing margin at block 304, devices are selected and placed on the slow gate phase as indicated at a block 310. From the provided paths with the nominal amount of timing margin at block 306, devices are evenly distributed on both the fast gate phase and on the slow gate phase as indicated at a block 312. From the provided paths with nominal amount of timing margin at block 308, devices are selected and placed on the slow gate phase as indicated at a block 314.

As indicated at a block 316, the chip timing tool 134 is run again with the new layout to determine path slack for the integrated circuit design. Then the timing results are examined to verify that the new layout did not change which group or sort a path was in previously as indicated at a block 318. Checking whether a path falls into a different sort is performed as indicated at a decision block 320. If determined that a path falls into a different sort, then the steps are repeated returning to block 302. Otherwise when no path falls into a different sort, then during the fabrication process, phases are skewed to achieve desired power and performance as indicated at a block 322.

Figure 4:
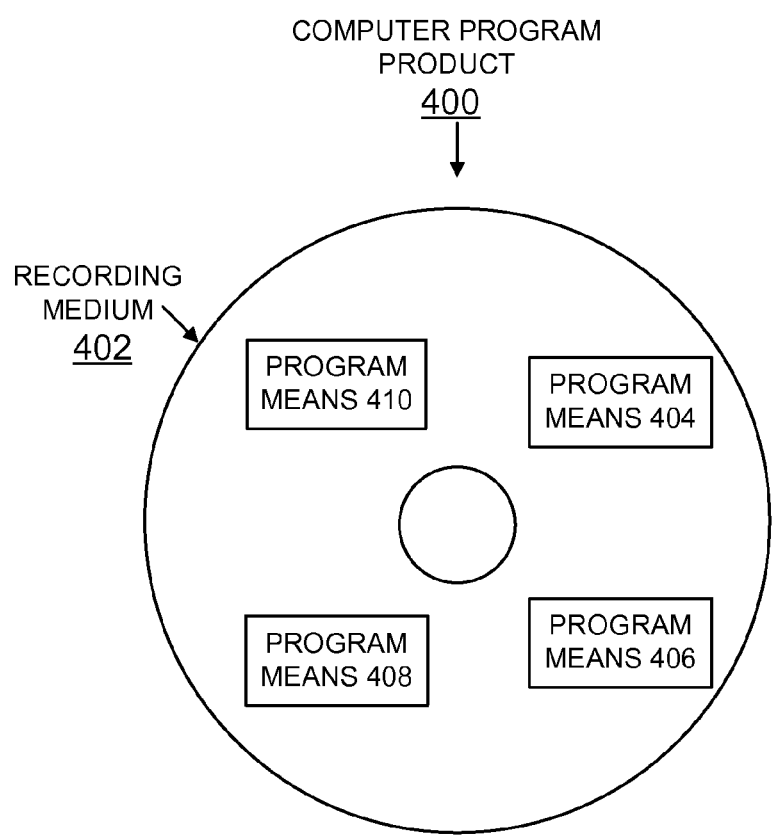
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied in a non-transitory machine readable recording medium 402, such as, a floppy disk, a high capacity read only memory in the form of an optically read compact disk or CD-ROM, a tape, or another similar computer program product. Recording medium 402 stores program means 404, 406, 408, 410 on the medium 402 for carrying out the methods for implementing circuit tuning post design of an integrated circuit utilizing gate phases of the preferred embodiment in the system 100 of FIGS. 1 and 2.

A sequence of program instructions or a logical assembly of one or more interrelated modules defined by the recorded program means 404, 406, 408, 410; direct the computer system 100 for implementing circuit tuning post design of an integrated circuit utilizing gate phases of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing circuit design tuning of an integrated circuit utilizing gate phases of gate phase processing selecting at least one of exposure time duration and intensity for printing gates during fabrication comprising:

using a computer, providing a designation for each phase of each device in the integrated circuit of one of a slow phase and a fast phase;

providing each device a phase designation based upon expected performance of the device in the integrated circuit including:

placing a device on the fast phase if the device is expected to be in a critical path or has a minimum timing slack; and placing a device on the slow phase if the device is not expected to be in a critical path or has excess timing slack.

2. The computer-implemented method as recited in claim 1, wherein the device comprising a wordline driver device, and wordline driver devices including multiple fingers, and further comprising placing a first finger of the wordline driver device on the fast phase and a second finger of the wordline driver device on the slow phase.

3. The computer-implemented method as recited in claim 1, wherein providing each device a phase designation includes placing data-in gates of a latch device including data inputs on the fast phase.

4. The computer-implemented method as recited in claim 3, further comprising placing scan-in gates of the latch device including scan inputs on the slow phase.

5. The computer-implemented method as recited in claim 1, wherein providing each device a phase designation includes placing gates of stacked logic devices having a source not connected to ground on the fast phase; and placing gates of stacked logic devices having a source connected to ground on the slow phase.

6. The computer-implemented method as recited in claim 1 wherein providing each device a phase designation includes placing gates of read port devices of storage cells on the fast phase.

7. The computer-implemented method as recited in claim 6, further comprising placing gates of write port devices of storage cells on the slow phase, and placing multiple fingers of wordline driver devices on the fast phase and placing multiple fingers of the wordline driver devices on the slow phase.

8. The computer-implemented method as recited in claim 1, wherein providing each device a phase designation includes placing selected devices evenly distributed on the fast phase and the slow phase.

9. An integrated circuit design computer program product for implementing circuit design tuning of an integrated circuit utilizing gate phases of gate phase processing selecting at least one of exposure time duration and intensity for printing gates during fabrication in a computer system, said computer program tangibly embodying a non-transitory machine readable medium used in the integrated circuit design process, said non-transitory machine readable medium including instructions executed by the computer system to cause the computer system to perform the steps of:

using a computer, providing a designation for each phase of each device in the integrated circuit of one of a slow phase and a fast phase;

providing each device a phase designation based upon expected performance of the device in the integrated circuit including:

placing a device on the fast phase if the device is expected be in a critical path or has a minimum timing slack; and placing a device on the slow phase if the device is not expected to be in a critical path or has excess timing slack.

10. The integrated circuit design program as recited in claim 9, wherein the device comprising a wordline driver device, and wordline driver devices including multiple fingers, and further comprising placing a first finger of the wordline driver device on the fast phase and a second finger of the-wordline driver device on the slow phase.

11. The integrated circuit design program as recited in claim 9, wherein providing each device a phase designation includes placing data-in gates of a latch device including data inputs on the fast phase and placing scan-in gates on the slow phase.

12. The integrated circuit design program as recited in claim 9, wherein providing each device a phase designation includes placing gates of stacked logic devices having a source not connected to ground on the fast phase; and placing gates of the stacked logic devices having a source connected to ground on the slow phase.

13. The integrated circuit design program as recited in claim 9, wherein providing each device a phase designation includes placing gates of read port devices of storage cells on the fast phase.

14. The integrated circuit design program as recited in claim 13, further comprising placing gates of write port devices of storage cells on the slow phase.

15. A system for implementing circuit design tuning of an integrated circuit utilizing gate phases of gate phase processing selecting at least one of exposure time duration and intensity for printing gates during fabrication, said system comprising:

a processor, an integrated circuit design program tangibly embodied in a machine readable medium used in the integrated circuit design process, said integrated circuit design program including a chip timing tool and a gate phase device placement tool, and said processor using said chip timing tool and said gate phase device placement tool, providing a designation for each phase of one of a slow phase and a fast phase;

said processor providing each device a phase designation based upon expected performance of the device in the integrated circuit including:

said processor placing a device on the fast phase based upon the device expected be in a critical path or having a minimum timing slack; and said processor placing a device on the slow phase based upon the device expected not to be in a critical path or having excess timing slack.

16. The system as recited in claim 15, wherein the device comprising a wordline driver device, and wordline driver devices including multiple fingers, and wherein said processor places a first finger of the wordline driver device on the fast phase and a second finger of the wordline driver device on the slow phase based upon the device being phase insensitive.

17. The system as recited in claim 15, wherein said processor providing each device a phase designation includes said processor placing data-in gates of a latch device including data inputs on the fast phase and said processor placing scan-in gates on the slow phase.

18. The system as recited in claim 15, wherein said processor providing each device a phase designation includes said processor placing gates of stacked logic devices having a source not connected to ground on the fast phase; and said processor placing gates of the stacked logic devices having a source connected to ground on the slow phase.

19. The system as recited in claim 15, wherein said processor providing each device a phase designation includes said processor placing gates of read port devices of storage cells the fast phase, and said processor placing gates of write port devices of storage cells on the slow phase.

20. The system as recited in claim 19, further comprising said processor placing multiple fingers of a wordline driver device on the fast phase and placing multiple fingers of the wordline driver device on the slow phase.

\* \* \* \* \*

UNITED STATES PATENT AND TRADEMARK OFFICE
CERTIFICATE OF CORRECTION

| | | |
|---|---|---|
| PATENT NO. | : 8,539,425 B1 | Page 1 of 1 |
| APPLICATION NO. | : 13/432349 | |
| DATED | : September 17, 2013 | |
| INVENTOR(S) | : Karl R. Erickson et al. | |

It is certified that error appears in the above-identified patent and that said Letters Patent is hereby corrected as shown below:

On the title page, item (75) is incorrect –
Inventor "Karl L. Erickson" should be --Karl R. Erickson--.

Signed and Sealed this
Twenty-sixth Day of May, 2015

Michelle K. Lee
*Director of the United States Patent and Trademark Office*